(12) United States Patent
Hsieh (10) Patent No.: US 7,579,810 B2
(45) Date of Patent: Aug. 25, 2009

(54) PORTABLE POWER SUPPLYING DEVICE

(76) Inventor: Hsin-Pei Hsieh, No. 21, Lane 164, Chien-Nan Rd., Nan-Tzu Dist., Kaohsiung (TW)

( * ) Notice: Subject to any disclaimer, the term of this patent is extended or adjusted under 35 U.S.C. 154(b) by 359 days.

(21) Appl. No.: 11/520,166

(22) Filed: Sep. 13, 2006

(65) Prior Publication Data
US 2008/0007215 A1  Jan. 10, 2008

(30) Foreign Application Priority Data
Jun. 16, 2006 (TW) .............................. 95210560 U (51) Int. Cl.
*H02J 7/00* (2006.01)
(52) U.S. Cl. .................... 320/110; 320/103; 320/114
(58) Field of Classification Search .............. 320/101, 320/103, 106, 107, 110, 111, 112, 113, 114, 320/115
See application file for complete search history.

(56) References Cited

U.S. PATENT DOCUMENTS 5,157,318 A * 10/1992 Wang ......................... 320/110

6,351,130 B1 * 2/2002 Preiser et al. ............... 324/426
2005/0231155 A1 10/2005 Huang

FOREIGN PATENT DOCUMENTS

JP 05094839 A * 4/1993

* cited by examiner

*Primary Examiner*—Akm E Ullah
*Assistant Examiner*—M'Baye Diao
(74) *Attorney, Agent, or Firm*—The Webb Law Firm (57) ABSTRACT

A portable power supplying device includes: a base; a terminal unit including first, second and third terminal sets disposed at first, second and third mounts in the base, respectively; a circuit switch operable in a selected one of a series connection state, where the circuit switch connects the first, second and third terminal sets such that batteries disposed at the first, second and third mounts are connected in series, and a parallel connection state, where the circuit switch connects the second and third terminal sets such that the batteries disposed at the second and third mounts are connected in parallel; and a switch control operable in a selected one of a non-power supplying state, where the switch control breaks electrical connection between an output terminal and the terminal unit, and a power supplying state, where the switch control makes electrical connection between the output terminal and the terminal unit.

7 Claims, 9 Drawing Sheets

PORTABLE POWER SUPPLYING DEVICE

CROSS-REFERENCE TO RELATED APPLICATION

This application claims priority of Taiwanese Application No. 095210560, filed on Jun. 16, 2006.

BACKGROUND OF THE INVENTION

1. Field of the Invention

The invention relates to a power supplying device, more particularly to a portable power supplying device.

2. Description of the Related Art

Figure 1:
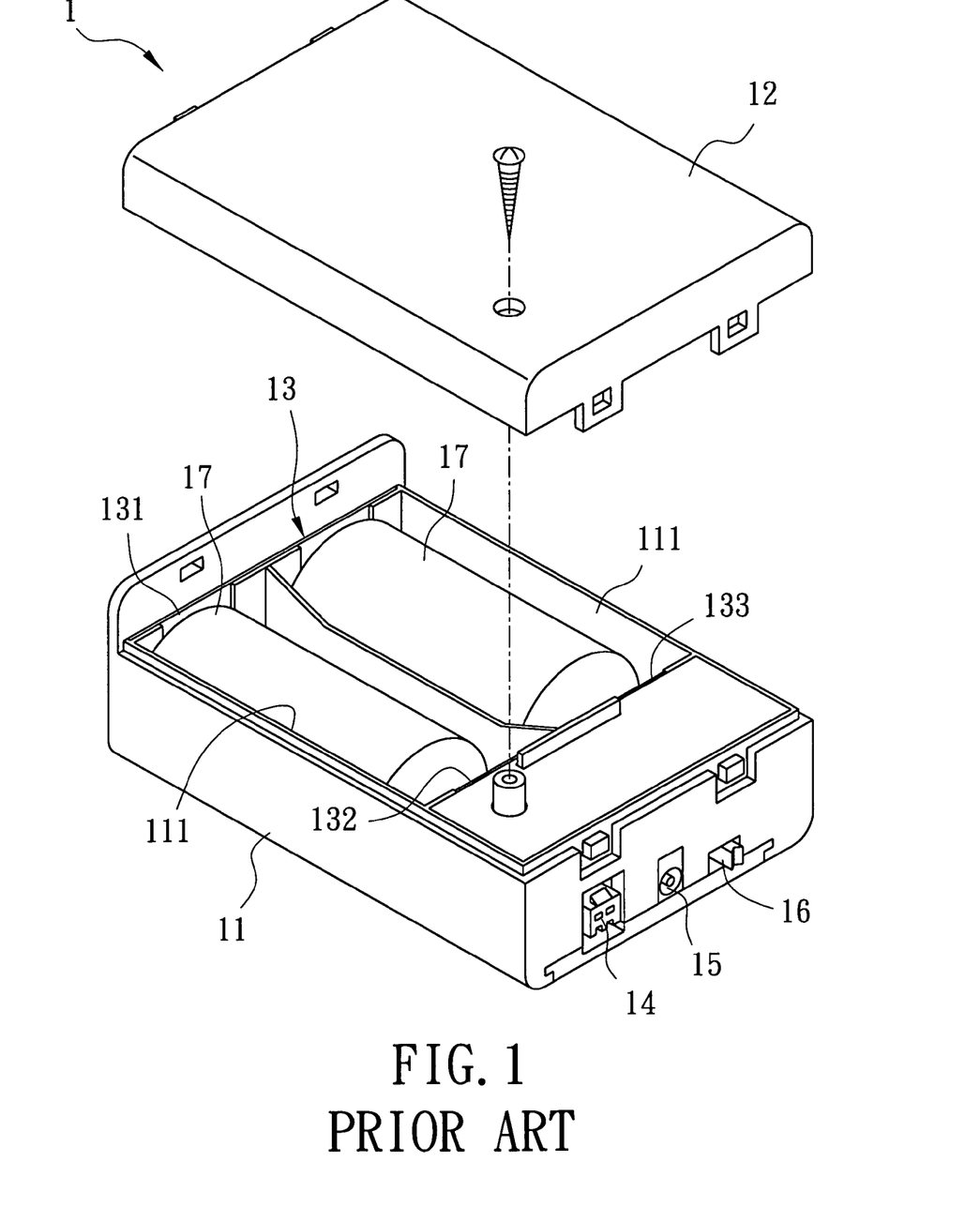
FIG. 1 is a perspective view of a battery pack disclosed in U.S. Patent Application Publication No. 2005/0231155A1.

As shown in FIG. 1, U.S. Patent Application Publication No. 2005/0231155A1, entitled "Battery Pack with Power Input/Output", discloses a battery pack 1 including a base 11, a cover 12 coupled removably to the base 11, a battery terminal unit 13, an output terminal 14 provided on one side of the base 11, an input terminal 15 provided on the side of the base 11 and adapted to connect to a commercial AC power source, and a switch control member 16 provided on the side of the base 11 and connected electrically to the output and input terminals 14, 15.

The base 11 is formed with two battery mounts 111 spaced apart from each other, and adapted to receive battery members 17 therein, respectively. The battery terminal unit 13 includes a positive/negative terminal 131, a negative terminal 133, and a positive terminal 132 that are mounted respectively to the battery mounts 111. The positive/negative terminal 131, the negative terminal 133, and the positive terminal 132 can be connected such that the battery members 17 received in the battery mounts 111 are connected in series, or can be connected such that the battery members 17 received in the battery mounts 111 are connected in parallel.

The switch control member 16 is operable in a selected one of a first power supplying state, where the switch control member 16 breaks electrical connection between the battery terminal unit 13 and the input unit 15, and makes electrical connection between the battery terminal unit 13 and the output terminal 14, such that the battery members 17 are able to supply power to an electrical device connected to the battery pack 1 via the output terminal 14, and a charging state, where the switch control member 16 breaks electrical connection between the battery terminal unit 13 and the output unit 14, and makes electrical connection between the battery terminal unit 13 and the input terminal 15, such that the battery members 17 are charged by the commercial AC power source via the input terminal 15.

In addition, the switch control member 16 is further operable in a second power supplying state when no battery members are received in the battery mounts 111, where the switch control member 16 makes electrical connection between the input and output terminals 15, 14 such that power is supplied to an electrical device via the output terminal 14 by the commercial AC power source that is connected to the input terminal 15.

Although the battery pack 1 can be used both as a power supplying device and as a charger, the battery pack 1 still has the following shortcomings:

1. The battery pack 1 is limited in that the output voltage cannot be adjusted according to different kinds of batteries, thereby making the battery pack 1 inconvenient to use:

Since the battery terminal unit 13 is provided such that the battery members 17 received in the battery mounts 111 are connected in a single fixed arrangement, i.e., either in series or in parallel, only batteries with specific voltage output levels can be used for the battery pack 1. In other words, the battery pack 1 is not suitable for a range of batteries with varying specifications, and is not adjustable for application to devices with different output voltage requirements.

2. The battery pack 1 is not suitable for outdoor use:

The battery pack 1 can only use the commercial AC power as its source for charging the battery members 17. If the battery members 17 are out of power when the battery pack 1 is at a location where commercial AC power is not available, then the battery pack 1 would become useless, i.e., can neither supply power to electronic devices nor charge battery members 17. Consequently, although the battery pack 1 is suitable for indoor use, it is relatively unsuitable for outdoor use.

SUMMARY OF THE INVENTION

Therefore, the object of the present invention is to provide a portable power-supplying device that is operable to vary electrical connections among batteries such that the portable power-supplying device is adapted to be used with various types of batteries.

According to the present invention, there is provided a portable power supplying device that includes a base, a battery terminal unit, a circuit switch assembly, and a switch control member. The base includes an output terminal, and is formed with first, second and third battery mounts adapted for receiving first, second and third battery members, respectively. The battery terminal unit includes a first battery terminal set disposed at the first battery mount, a second battery terminal set disposed at the second battery mount, and a third battery terminal set disposed at the third battery mount. The circuit switch assembly is connected to the first, second and third battery terminal sets, and is operable in a selected one of a series connection state, where the circuit switch assembly connects the first, second and third battery terminal sets such that the first, second and third battery members are connected in series, and a parallel connection state, where the circuit switch assembly connects the second and third battery terminal sets such that the second and third battery members are connected in parallel. The switch control member is provided on the base, is connected electrically to the output terminal, and is operable in a selected one of a non-power supplying state, where the switch control member breaks electrical connection between the output terminal and the battery terminal unit, and a power supplying state, where the switch control member makes electrical connection between the output terminal and the battery terminal unit such that the first, second and third battery members are able to supply power to the output terminal when the circuit switch assembly is operated in the series connection state, and such that the second and third battery members are able to supply power to the output terminal when the circuit switch assembly is operated in the parallel connection state.

BRIEF DESCRIPTION OF THE DRAWINGS

Other features and advantages of the present invention will become apparent in the following detailed description of the preferred embodiment with reference to the accompanying drawings, of which:

FIG. 4-1 is a schematic diagram of the preferred embodiment, illustrating electrical connections between a battery terminal unit and a circuit switch assembly;

FIG. 4-2 is a schematic diagram of the preferred embodiment, illustrating the circuit switch assembly operated in a series connection state;

FIG. 4-3 is a schematic view of the preferred embodiment, illustrating the circuit switch assembly operated in a parallel connection state;

FIG. 5-1 is a perspective view illustrating a first exemplary operation of the preferred embodiment;

FIG. 5-2 is a schematic side view of the preferred embodiment in FIG. 5-1;

DETAILED DESCRIPTION OF THE PREFERRED EMBODIMENT

Figure 2:
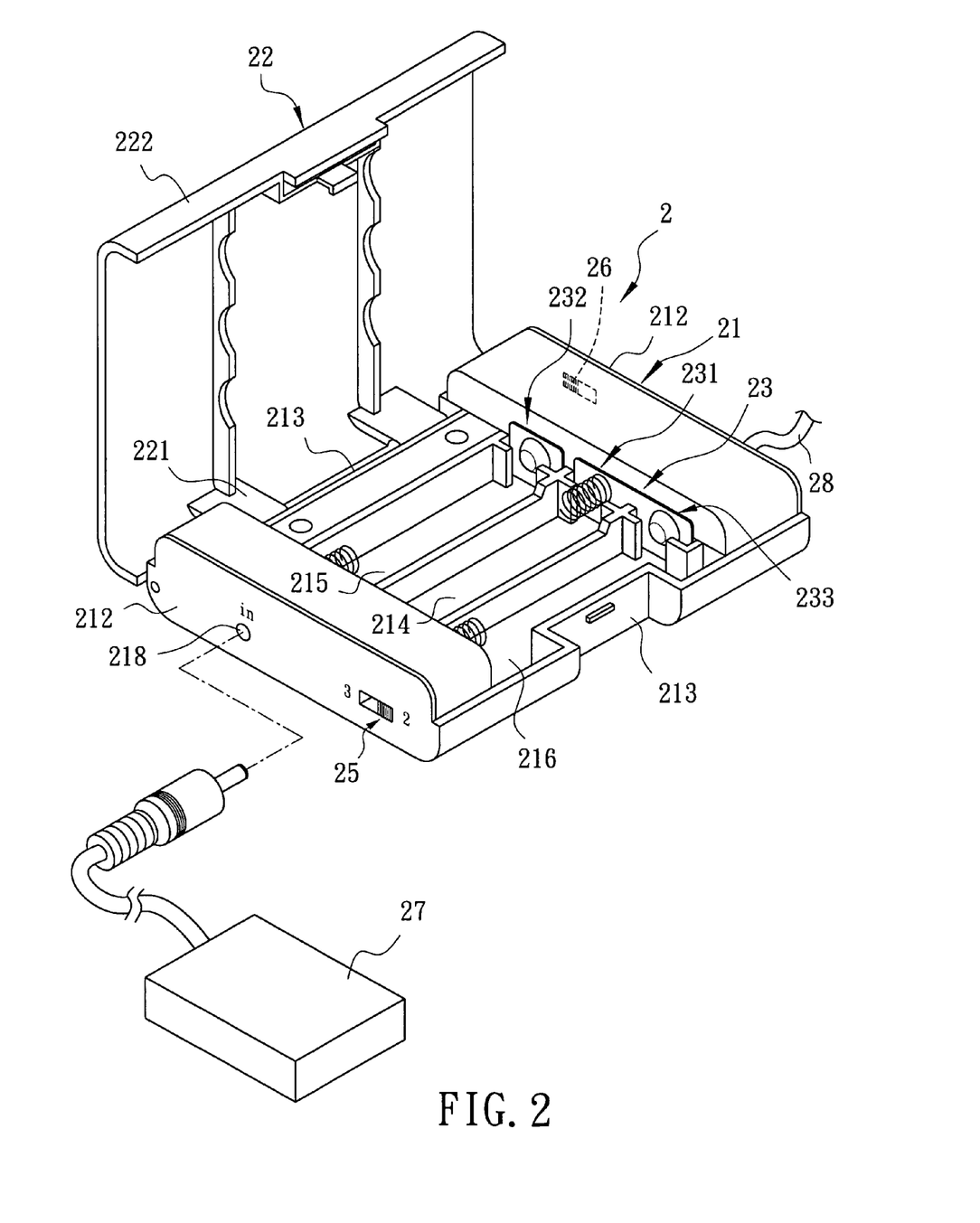
FIG. 2 is a perspective view of the preferred embodiment of a portable power supplying device according to the present invention.
Figure 3:
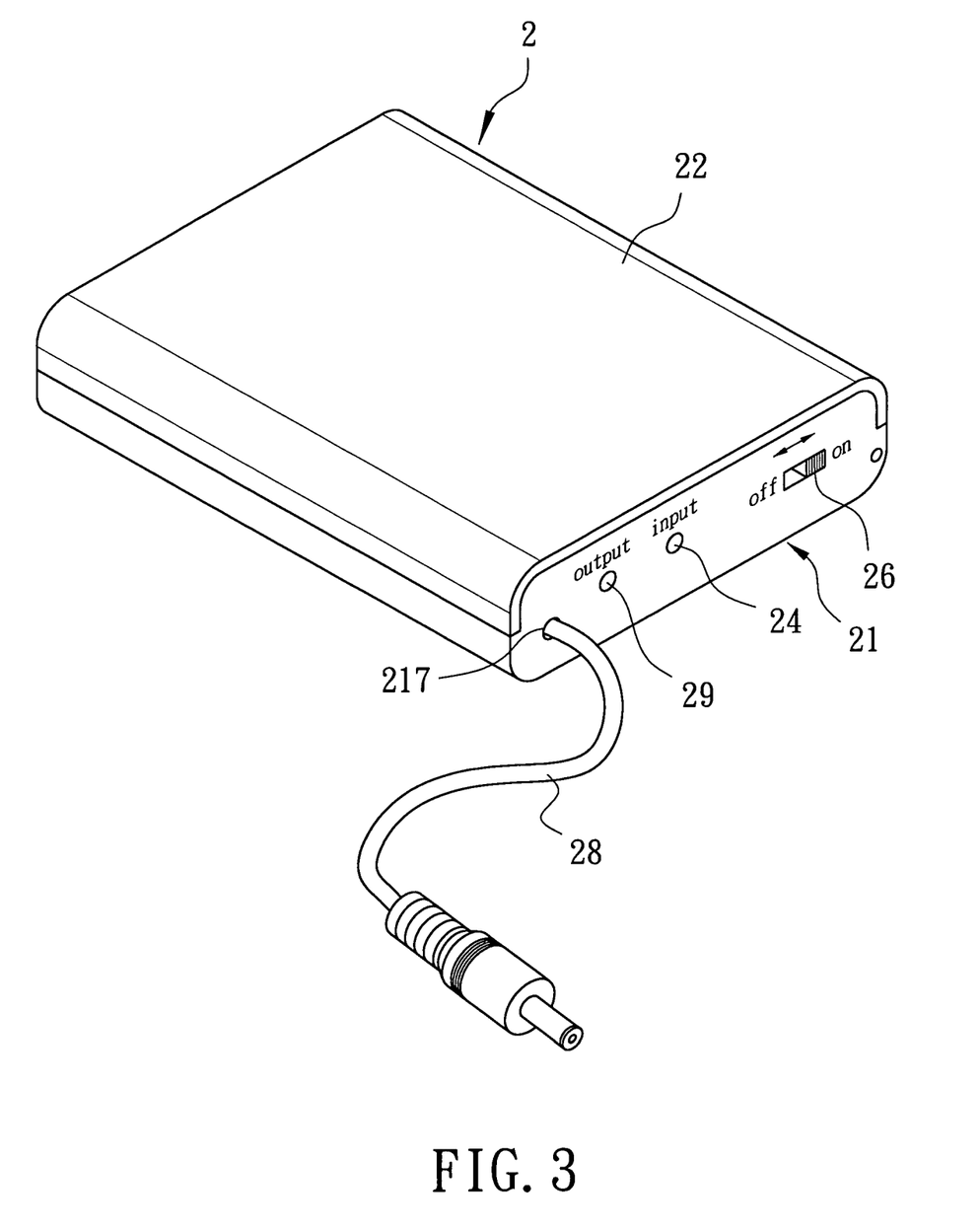
FIG. 3 is a fragmentary perspective view of the preferred embodiment.
Figure 51:
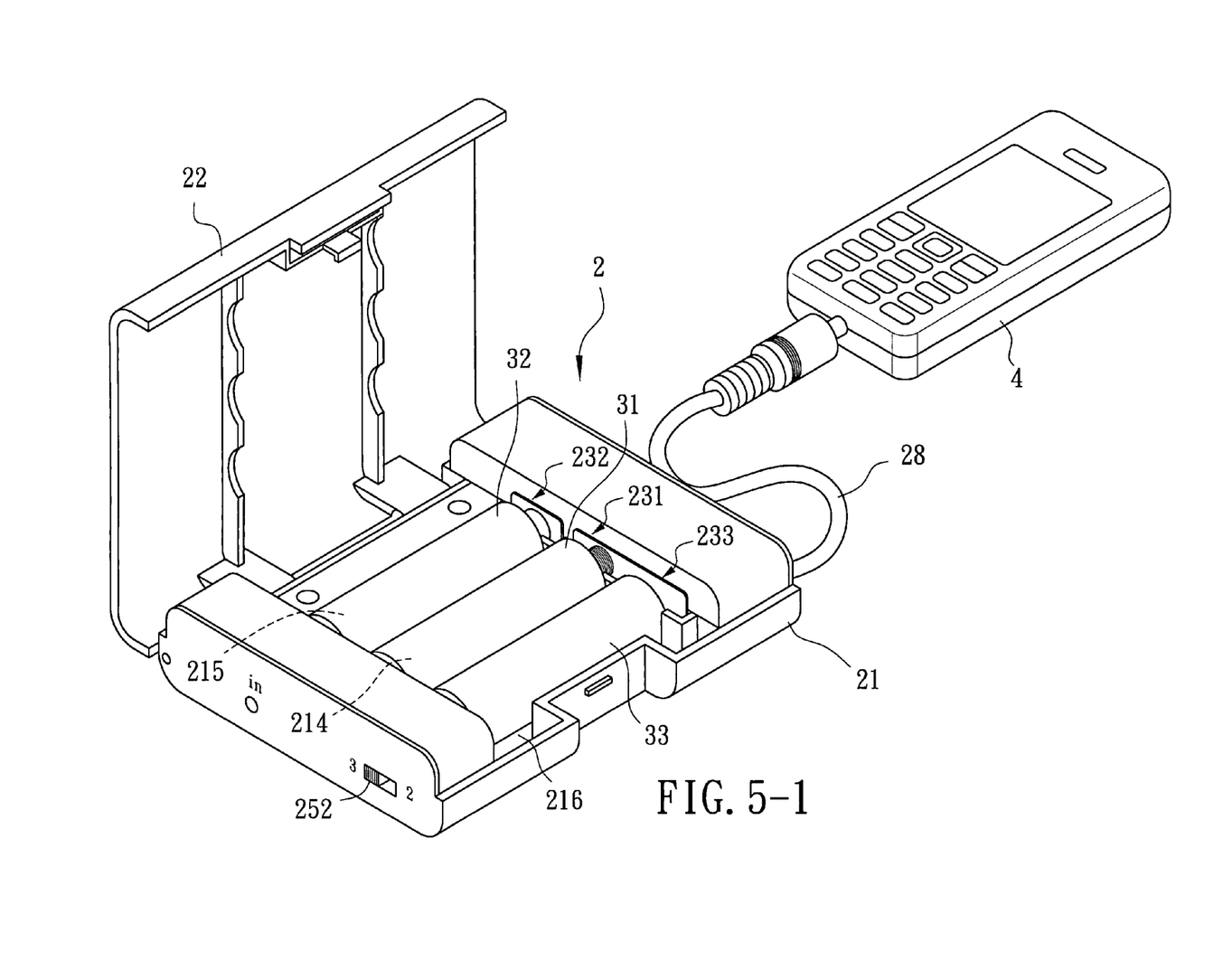

As shown in FIG. 2 and FIG. 3, the preferred embodiment of a portable power supplying device 2 according to the present invention includes abase 21, a cover 22, a battery terminal unit 23, a circuit switch assembly 25, a switch control member 26, a solar power generator 27, an output wire 28, a power-supply indicator 29, and a charging indicator 24. The base 21 is substantially rectangular in shape, and includes opposite control side walls 212, opposite engaging side walls 213 connected to the control side walls 212, an output terminal 217, and an input terminal 218. With further reference to FIG. 5-1, the base 21 is formed with first, second and third battery mounts 214, 215, 216 adapted for receiving first, second and third battery members 31, 32, 33, respectively. Each of the first, second and third battery members 31, 32, 33 can be a silver oxide battery, an alkaline battery, a manganese dioxide-zinc battery, etc.

In this embodiment, the first battery mount 214 is disposed between the second and third battery mounts 215, 216. The output terminal 217, the power-supply indicator 29, the charging indicator 24, and the switch control member 26 are provided on one of the control side walls 212. The input terminal 218 and the circuit switch assembly 25 are provided on the other one of the control side walls 212.

The cover 22 has a first engaging side part 221 connected pivotally to one of the engaging side walls 213 of the base 21, and a second engaging side part 222 engaging removably the other one of the engaging side walls 213 of the base 21. The cover 22 is operable to cover and uncover the first, second and third battery mounts 214, 215, 216 of the base 21.

Figure 41:
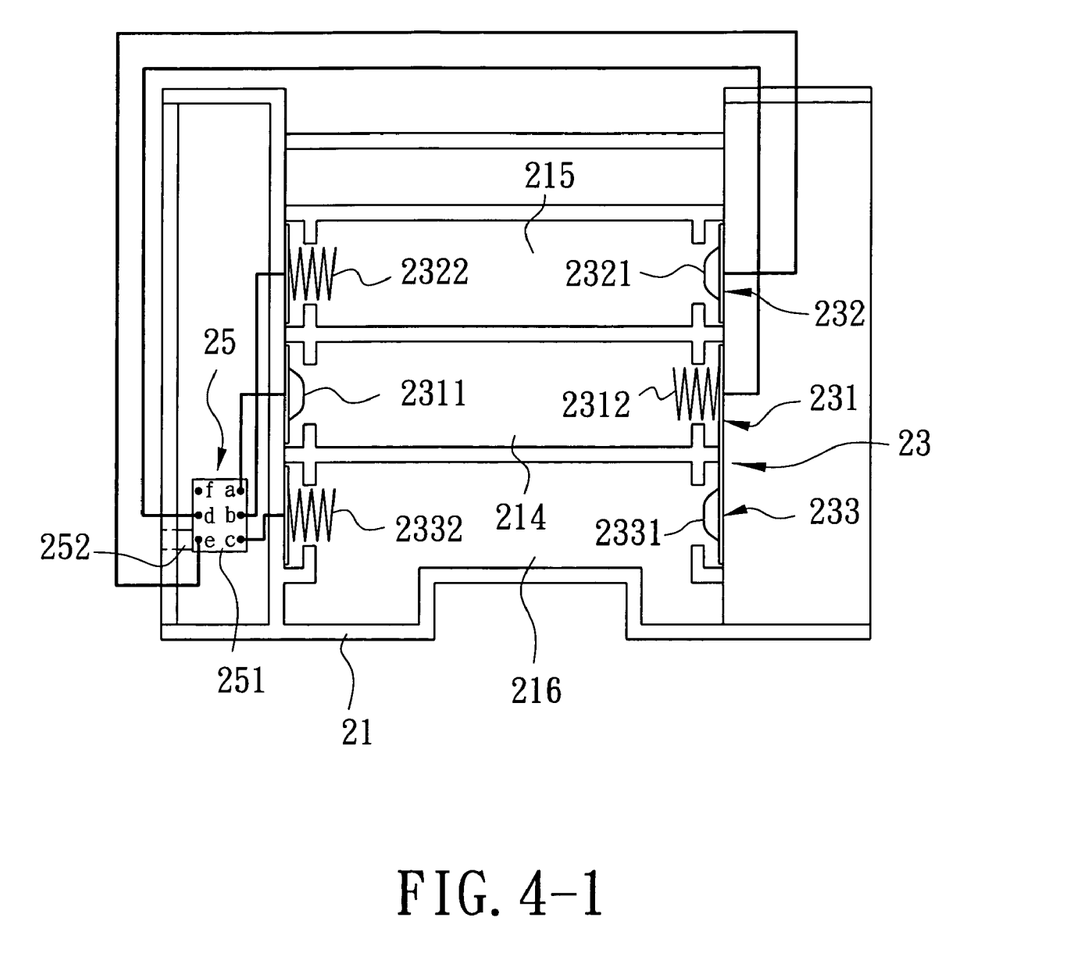

As shown in FIG. 4-1, the battery terminal unit 23 includes a first battery terminal set 231 disposed at the first battery mount 214, a second battery terminal set 232 disposed at the second battery mount 215, and a third battery terminal set 233 disposed at the third battery mount 216. The first battery terminal set 231 includes first positive and first negative battery terminals 2311, 2312 mounted to opposite ends of the first battery mount 214. The first positive battery terminal 2311 is disposed proximate to the input terminal 218 of the base 21, and the first negative battery terminal 2311 is disposed proximate to the output terminal 217. The second battery terminal set 232 includes second positive and second negative battery terminals 2321, 2322 mounted to opposite ends of the second battery mount 215. The third battery terminal set 233 includes third positive and third negative battery terminals 2331, 2332 mounted to opposite ends of the third battery mount 216. The second and third positive battery terminals 2321, 2331 are disposed adjacent to the first negative battery terminal 2312. The second and third negative battery terminals 2322, 2332 are disposed adjacent to the first positive battery terminal 2311. The first negative battery terminal 2312 is connected to the third positive battery terminal 2331.

The circuit switch assembly 25 is connected to the first, second and third battery terminal sets 231, 232, 233, and is operable in a selected one of a series connection state and a parallel connection state. The circuit switch assembly 25 connects the first, second and third battery terminal sets 231, 232, 233 such that the first, second and third battery members 31, 32, 33 (shown in FIG. 5-1) are connected in series when the circuit switch assembly is operated in the series connection state. The circuit switch assembly 25 connects the second and third battery terminal sets 232, 233 such that the second and third battery members 32, 33 are connected in parallel, while the first battery terminal set 231 is not in use, when the circuit switch assembly 25 is operated in the parallel connection state.

In this embodiment, the circuit switch assembly 25 includes a main body 251 disposed in the base 21, and a switching member 252 connected to the main body 251 and exposed from the base 21. The main body 251 includes a first node (a) connected electrically to the first positive battery terminal 2311, a second node (b) connected electrically to the second negative battery terminal 2322, a third node (c) connected electrically to the third negative battery terminal 2332, a fourth node (d) connected electrically to the first negative battery terminal 2312, a fifth node (e) connected electrically to the second positive battery terminal 2321, and a sixth node (f). The switching member 252 is operable in a selected one of Location 3 and Location 2 (as shown in FIG. 2) to control the main body 251 to operate the circuit switch assembly 25 in the selected one of the series connection and parallel connection states.

Figure 42:
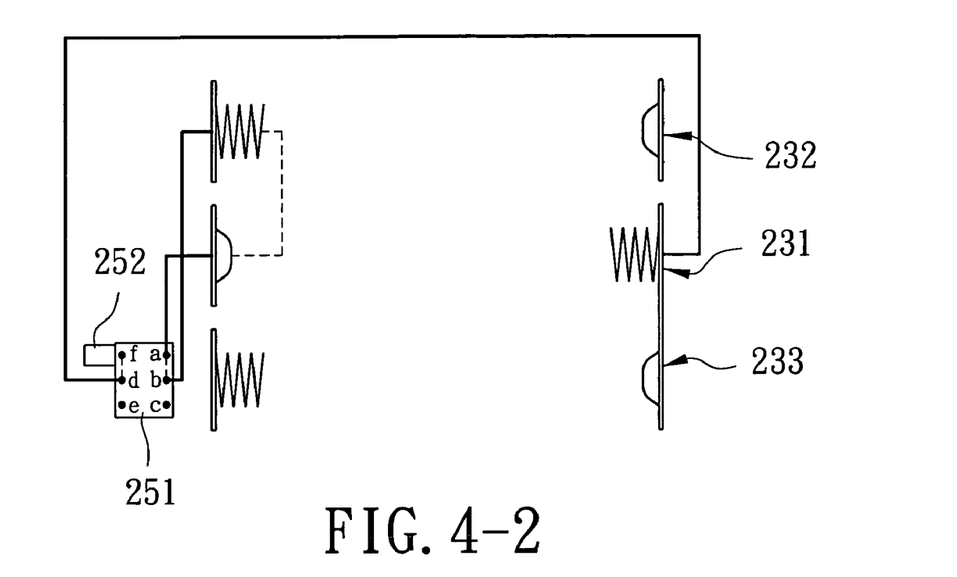
Figure 43:
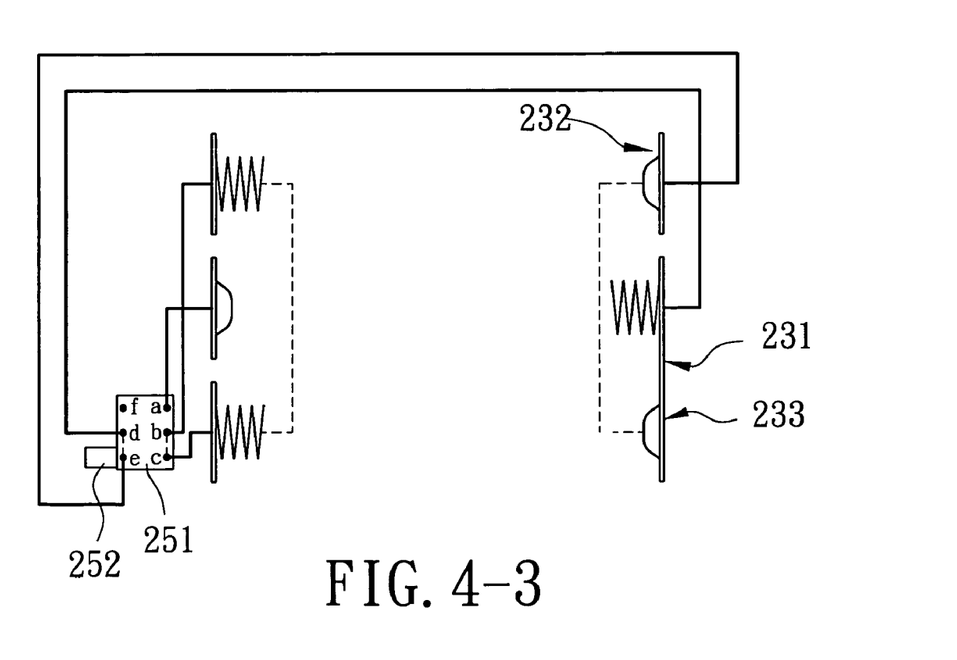

As shown in FIG. 4-2, the first and second nodes (a), (b) are connected electrically to each other, and the fourth and sixth nodes (d), (f) are connected electrically to each other when the circuit switch assembly 25 is operated in the series connection state, which corresponds to the switching member 252 being disposed at Location 3 in FIG. 2. The second and third nodes (b), (c) are connected electrically to each other, and the fourth and fifth nodes (d), (e) are connected electrically to each other when the circuit switch assembly 25 is operated in the parallel connection state, which corresponds to the switching member 252 being disposed at Location 2 in FIG. 2.

The solar-power generator 27, which is connected removably to the input terminal 218, is for collecting solar energy and converting the solar energy thus collected into electrical energy.

The switch control member 26 is provided on the base 21, is connected electrically to the output terminal 217 and the input terminal 218, and is operable in a selected one of a non-power supplying state and a power supplying state.

The switch control member 26 breaks electrical connection between the output terminal 217 and the battery terminal unit 23, and makes electrical connection between the input terminal 218 and the battery terminal unit 23 when the switch control member 26 is operated in the non-power supplying state, such that the first, second and third battery members 31, 32, 33 are charged by the solar power generator 27 via the input terminal 218 when the circuit switch assembly 25 is operated in the series connection state, and such that the second and third battery members 32, 33 are charged by the solar power generator 27 via the input terminal 218 when the circuit switch assembly 25 is operated in the parallel connection state. The charging indicator 24, which is connected electrically to the switch control member 26, is for providing visual indication when the switch control member 26 is operated in the non-power supplying state such that at least the second and third battery members 32, 33 are charged by the solar power generator 27 via the input terminal 218.

The switch control member 26 makes electrical connection between the output terminal 217 and the battery terminal unit 23, and breaks electrical connection between the input terminal 218 and the battery terminal unit 23 when the switch control member 26 is operated in the power supplying state, such that the first, second and third battery members 31, 32, 33 are able to supply power to the output terminal 217 when the circuit switch assembly 25 is operated in the series connection state, and such that the second and third battery members 32, 33 are able to supply power to the output terminal 217 when the circuit switch assembly 25 is operated in the parallel connection state. The power-supply indicator 29, which is connected electrically to the switch control member 26, is for providing visual indication when the switch control member 26 is operated in the power supplying state such that at least the second and third battery members 32, 33 provide power to the output terminal 217.

The output wire 28 is connected electrically to the output terminal 217 at one end, and is adapted to be connected to an electrical device, such as a mobile phone 4 (shown in FIG. 5-1), at the other end for charging the electrical device when the switch control member 26 is operated in the power supplying state such that at least the second and third battery members 32, 33 provide power to the output terminal 217.

Figure 52:
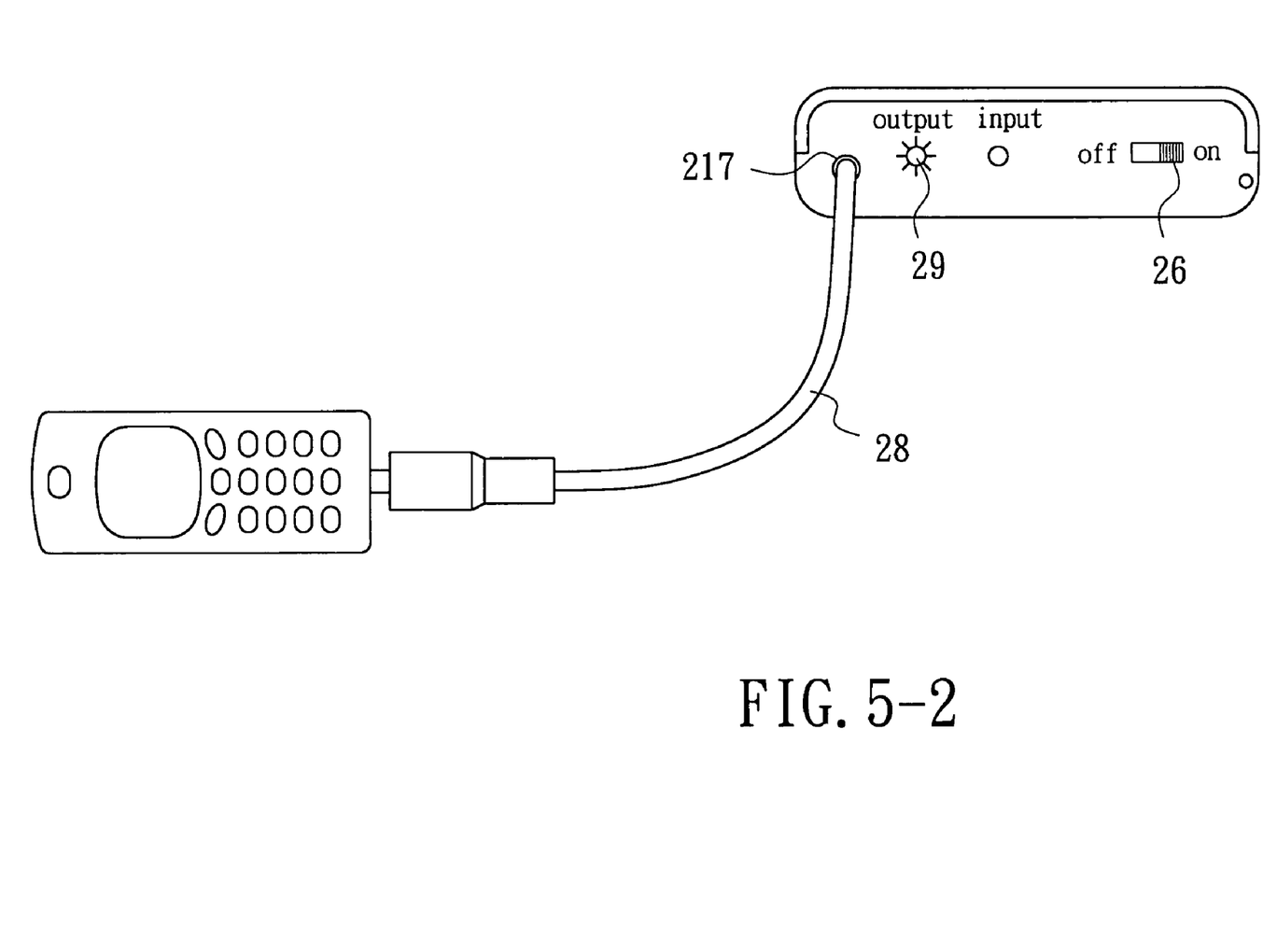

FIG. 5-1 illustrates a first exemplary operation of the portable power supplying device 2, where the portable power supplying device 2 is used for charging a mobile phone 4, when the circuit switch assembly 25 is operated in the series connection state. Firstly, the first, second and third battery members 31, 32, 33 are disposed respectively at the first, second and third battery mounts 214, 215, 216 of the base 21. Secondly, the switching member 252 is moved to Location 3 so as to operate the circuit switch assembly 25 in the series connection state. The cover 22 is then closed to cover the first, second and third battery mounts 214, 215, 216 so as to isolate the first, second and third battery members 31, 32, 33 from the environment (as illustrated in FIG. 5-2). Next, the output wire 28 is connected electrically to a charging terminal of the mobile phone 4. Lastly, the switch control member 26 is moved to Location "on" shown in FIG. 5-2 so as to operate in the power supplying state. As a result, the first, second and third battery members 31, 32, 33 provide power to the output terminal 217 to charge the mobile phone 4 via the output wire 28. At the same time, the power-supply indicator 29 is lit to indicate that the first, second and third battery members 31, 32, 33 are supplying power.

Figure 6:
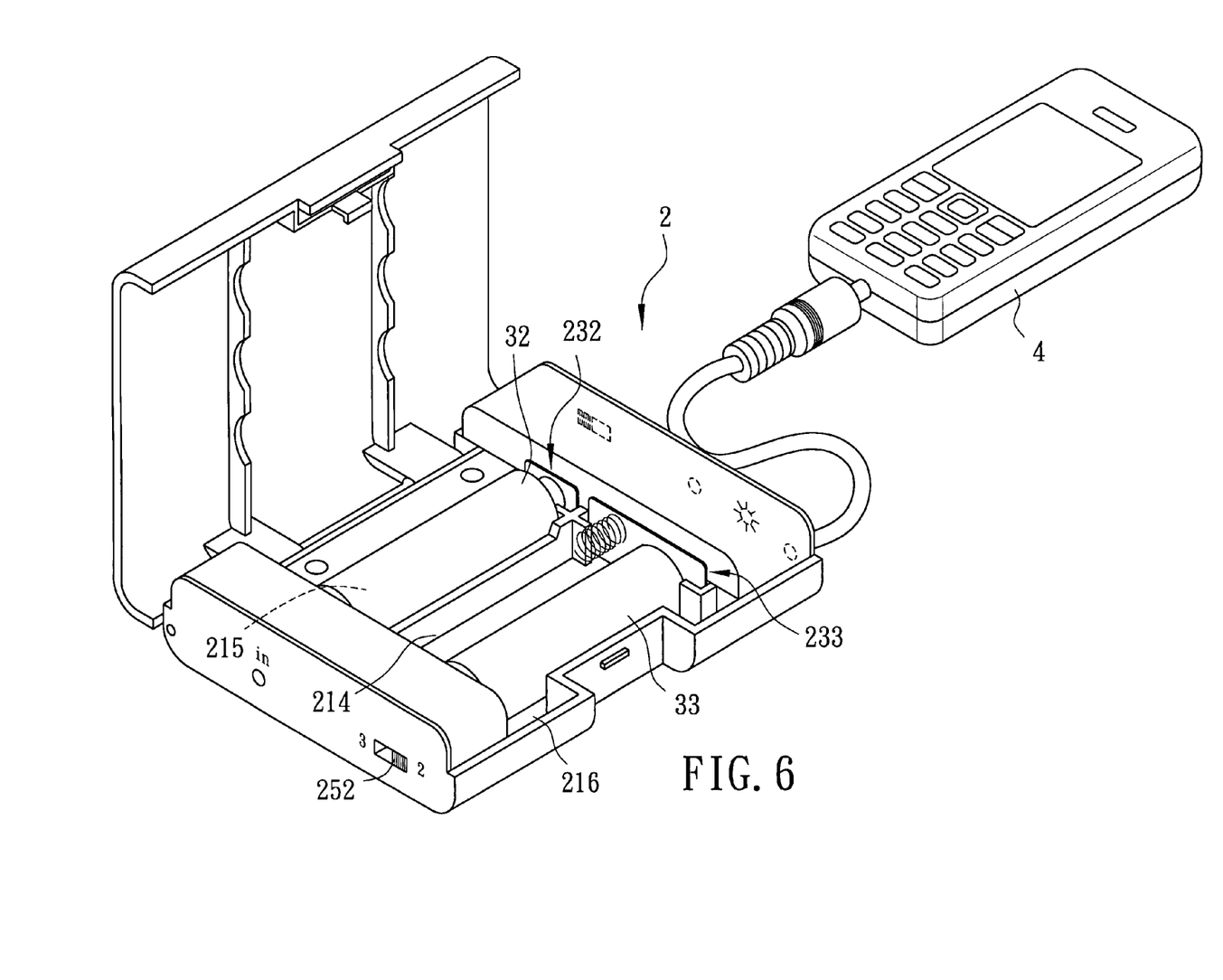
FIG. 6 is a perspective view illustrating a second exemplary operation of the preferred embodiment.

FIG. 6 illustrates a second exemplary operation of the portable power supplying device 2, where the portable power supplying device 2 is used for charging a mobile phone 4, when the circuit switch assembly 25 is operated in the parallel connection state. Firstly, the second and third battery members 32, 33 (e.g., Lithium batteries) are disposed respectively at the second and third battery mounts 215, 216 of the base 21. Secondly, the switching member 252 is moved to Location 2 so as to operate the circuit switch assembly 25 in the parallel connection state. As with the first exemplary operation, the switch control member 26 is also moved to Location "on" (as shown in FIG. 5-2) so as to operate in the power supplying state. As a result, the second and third battery members 32, 33 provide power to the output terminal 217 to charge the mobile phone 4 via the output wire 28, and the power-supply indicator 29 is lit.

Figure 7:
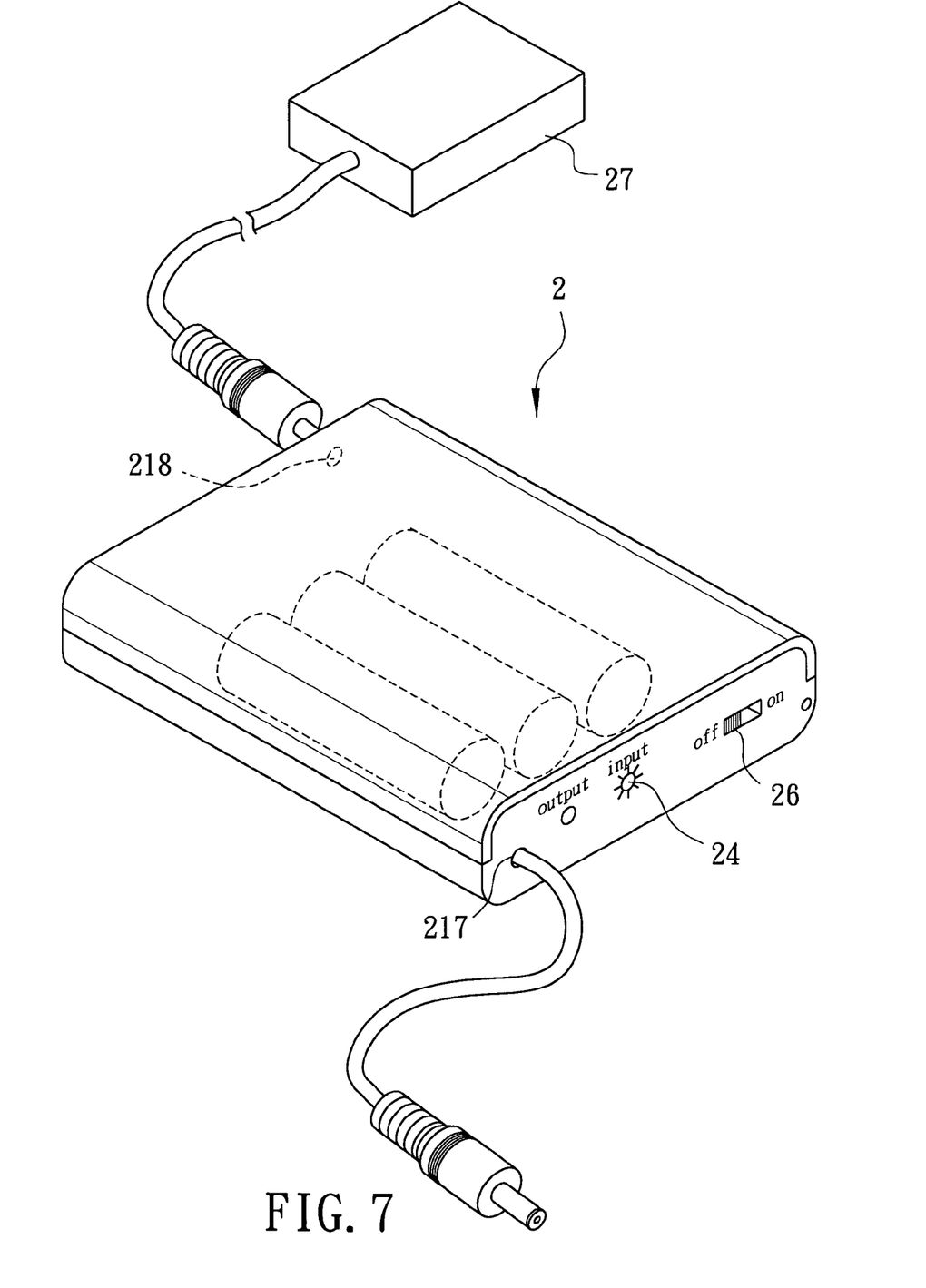
FIG. 7 is a perspective view illustrating a third exemplary operation of the preferred embodiment.

FIG. 7 illustrates a third exemplary operation of the portable power supplying device 2, where the portable power supplying device 2 is used for charging rechargeable batteries, such as Lithium batteries, Nickel Metal Hydride batteries, or Nickel Cadmium batteries. The circuit switch assembly 25 is operated in the series connection state for illustrative purposes. The solar power generator 27 is connected to the input terminal 218. Different from the first exemplary operation, the switch control member 26 is moved to Location "off" so as to operate in the non-power supplying state. As a result, the first, second and third battery members 31, 32, 33 are charged with electrical energy generated by the solar power generator 27 via the input terminal 218. At the same time, the charging indicator 24 is lit to indicate that the first, second and third battery members 31, 32, 33 are being charged.

It is apparent from the foregoing that the portable power supplying device 2 has the following advantages:

1. The portable power supplying device 2 is suitable for use with different types of batteries:

By operating the circuit switch assembly 25 between the series and parallel connection states, the connections among the first, second and third battery terminal sets 231, 232, 233 are changed so as to vary the connections among the first, second and third batteries 31, 32, 33 in a selected one of the series or parallel connections. As a result, the portable power supplying device 2 can expand its application to batteries with different specifications and output voltage levels.

2. The portable power supplying device 2 is suitable for outdoor use:

By operating the switch control member 26 between the power supplying and non-power supplying states, the portable power supplying device 2 can be used to supply power to electronic devices, or can be used to charge batteries. In particular, the solar power generator 27 can effectively collect and convert solar energy into electrical energy for charging batteries. As a result, unlike the prior art, the portable power supplying device 2 would not end up useless when batteries run out of power and when commercial AC power is unavailable.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A portable power supplying device comprising:
a base including an output terminal, and formed with first, second and third battery mounts adapted for receiving first, second and third battery members, respectively;
a battery terminal unit including a first battery terminal set disposed at said first battery mount, a second battery terminal set disposed at said second battery mount, and a third battery terminal set disposed at said third battery mount;
a circuit switch assembly connected to said first, second and third battery terminal sets, and operable in a selected one of a series connection state, where said circuit switch assembly connects said first, second and third battery terminal sets such that the first, second and third battery members are connected in series, and a parallel connection state, where said circuit switch assembly connects said second and third battery terminal sets such that the second and third battery members are connected in parallel; and a switch control member provided on said base, connected electrically to said output terminal, and operable in a selected one of a non-power supplying state, where said switch control member breaks electrical connection between said output terminal and said battery terminal unit, and a power supplying state, where said switch control member makes electrical connection between said output terminal and said battery terminal unit such that the first, second and third battery members are able to supply power to said output terminal when said circuit switch assembly is operated in the series connection state, and such that the second and third battery members are able to supply power to said output terminal when said circuit switch assembly is operated in the parallel connection state;

wherein said first, second and third battery terminal sets respectively include first, second and third positive battery terminals, and first, second and third negative battery terminals, mounted to respective ends of said first, second and third battery mounts, said second and third positive battery terminals being disposed adjacent to said first negative battery terminal, said second and third negative battery terminals being disposed adjacent to said first positive battery terminal, said first negative battery terminal being connected to said third positive battery terminal;

wherein said circuit switch assembly includes a main body disposed in said base, and a switching member connected to said main body and exposed from said base, said main body including a first node connected electrically to said first positive battery terminal, a second node connected electrically to said second negative battery terminal, a third node connected electrically to said third negative battery terminal, a fourth node connected electrically to said first negative battery terminal, a fifth node connected electrically to said second positive battery terminal, and a sixth node;

wherein said switching member is operable to control said main body to operate said circuit switch assembly in the selected one of the series connection and parallel connection states;

wherein said first and second nodes are connected electrically to each other, and said fourth and sixth nodes are connected electrically to each other when said circuit switch assembly is operated in the series connection state; and wherein said second and third nodes are connected electrically to each other, and said fourth and fifth nodes are connected electrically to each other when said circuit switch assembly is operated in the parallel connection state.

2. A portable power supplying device comprising:

a base including an output terminal, and formed with first, second and third battery mounts adapted for receiving first, second and third battery members, respectively;

a battery terminal unit including a first battery terminal set disposed at said first battery mount, a second battery terminal set disposed at said second battery mount, and a third battery terminal set disposed at said third battery mount;

a circuit switch assembly connected to said first, second and third battery terminal sets, and operable in a selected one of a series connection state, where said circuit switch assembly connects said first, second and third battery terminal sets such that the first, second and third battery members are connected in series, and a parallel connection state, where said circuit switch assembly connects said second and third battery terminal sets such that the second and third battery members are connected in parallel; and a switch control member provided on said base, connected electrically to said output terminal, and operable in a selected one of a non-power supplying state, where said switch control member breaks electrical connection between said output terminal and said battery terminal unit, and a power supplying state, where said switch control member makes electrical connection between said output terminal and said battery terminal unit such that the first, second and third battery members are able to supply power to said output terminal when said circuit switch assembly is operated in the series connection state, and such that the second and third battery members are able to supply power to said output terminal when said circuit switch assembly is operated in the parallel connection state;

wherein said base further includes an input terminal connected electrically to said switch control member, said portable power supplying device further comprising a solar-power generator connected removably to said input terminal for collecting solar energy and converting the solar energy thus collected into electrical energy, said switch control member further making electrical connection between said input terminal and said battery terminal unit when said switch control member is operated in the non-power supplying state, and further breaking electrical connection between said input terminal and said battery terminal unit when said switch control member is operated in the power supplying state.

3. The portable power supplying device as claimed in claim 2, further comprising an output wire connected electrically to said output terminal.

4. The portable power supplying device as claimed in claim 3, further comprising a power-supply indicator connected electrically to said switch control member and disposed on said base for providing visual indication when said switch control member is operated in the power supplying state such that at least the second and third battery members provide power to said output terminal.

5. The portable power supplying device as claimed in claim 3, further comprising a charging indicator connected electrically to said switch control member and disposed on said base for providing visual indication when said switch control member is operated in the non-power supplying state such that at least the second and third battery members are charged by said solar power generator via said input terminal.

6. The portable power supplying device as claimed in claim 2, wherein said base includes opposite control side walls provided with said input and output terminals, said switch control member, and said circuit switch assembly.

7. The portable power supplying device as claimed in claim 6, wherein said base further includes opposite engaging side walls connected to said control side walls, said portable power supplying device further comprising a cover that has a first engaging side part connected pivotally to one of said engaging side walls of said base, and a second engaging side part engaging removably the other one of said engaging side walls of said base, such that said cover is operable to cover and uncover said first, second and third battery mounts of said base.

* * * * *